US00RE43862E

(19) United States
(12) Reissued Patent
Osborn

(10) Patent Number: US RE43,862 E
(45) Date of Reissued Patent: Dec. 11, 2012

(54) PALMTOP COMPUTER EXPANSION USING SHAPED MEMORY ACCESS

(75) Inventor: Neal A. Osborn, Milpitas, CA (US)

(73) Assignee: Hewlett-Packard Development Company, L.P., Houston, TX (US)

(21) Appl. No.: 12/157,134

(22) Filed: Jun. 6, 2008

Related U.S. Patent Documents

Reissue of:
(64) Patent No.: 6,738,852
Issued: May 18, 2004
Appl. No.: 09/671,657
Filed: Sep. 27, 2000

U.S. Applications:
(63) Continuation of application No. 11/437,005, filed on May 16, 2006, now Pat. No. Re. 40,421.

(51) Int. Cl.
*G06F 13/00* (2006.01)
(52) U.S. Cl. ..... 710/303
(58) Field of Classification Search ..... 710/72, 710/301, 303
See application file for complete search history.

(56) References Cited

U.S. PATENT DOCUMENTS

| | | | | | |
|---|---|---|---|---|---|
| 4,204,251 | A * | 5/1980 | Brudevold | 710/305 |
| 4,648,030 | A * | 3/1987 | Bomba et al. | 711/141 |
| 4,661,905 | A * | 4/1987 | Bomba et al. | 710/113 |
| 4,744,078 | A * | 5/1988 | Kowalczyk | 370/364 |
| 4,943,911 | A * | 7/1990 | Kopp et al. | 713/2 |
| 4,954,949 | A * | 9/1990 | Rubin | 710/301 |
| 5,469,507 | A * | 11/1995 | Canetti et al. | 380/30 |
| 5,548,728 | A * | 8/1996 | Danknick | 709/213 |
| 5,574,929 | A * | 11/1996 | Pieterse et al. | 712/30 |
| 5,687,346 | A * | 11/1997 | Shinohara | 711/130 |
| 5,898,869 | A * | 4/1999 | Anderson | 713/2 |
| 6,128,689 | A * | 10/2000 | Hassbjer et al. | 710/305 |
| 6,182,010 | B1 * | 1/2001 | Berstis | 701/441 |
| 6,266,539 | B1 * | 7/2001 | Pardo | 455/556.2 |
| 6,496,874 | B1 * | 12/2002 | Janky et al. | 710/1 |
| 6,523,079 | B2 * | 2/2003 | Kikinis et al. | 710/303 |
| 6,546,297 | B1 * | 4/2003 | Gaston et al. | 700/83 |
| 6,728,812 | B1 * | 4/2004 | Kato | 710/303 |
| 2001/0034803 | A1 * | 10/2001 | Sorek et al. | 710/129 |
| 2002/0078248 | A1 * | 6/2002 | Janik et al. | 709/252 |
| 2002/0137505 | A1 * | 9/2002 | Eiche et al. | 455/425 |

FOREIGN PATENT DOCUMENTS

WO WO 9800789 A1 * 1/1998

OTHER PUBLICATIONS

SC Card Association Press Reliese, http://www.sdcard.org/press7, Jun. 27, 2000.*

* cited by examiner

*Primary Examiner* — Paul R Myers

(57) ABSTRACT

A palmtop computer utilizes SD memory modules or other types of memory modules to provide expansion memory. The expansion memory module plugs in to the palmtop computer via an external slot or compartment that is easily accessed by the user. This provides additional memory to the palmtop computer. To facilitate use of expansion devices such as sled or cradle based devices, a connector is provided on the palmtop computer that not only includes conventional power, ground and serial communication terminals, but also provides direct access to the memory module for use by the expansion device. This provides the advantage that the sled or cradle based device can directly access the palmtop computer's memory without using the palmtop computer's processing resources.

12 Claims, 10 Drawing Sheets

PALMTOP COMPUTER EXPANSION USING SHAPED MEMORY ACCESS

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,738,852. The reissue applications are application Ser. No. 11/437,005 filed on May 16, 2006 and is a parent reissue application of U.S. Pat. No. 6,738,852, and application Ser. No. 12/157,134 (the present application) filed on Jun. 6, 2008 and is a continuation reissue application of parent reissue application Ser. No. 11/437,005 filed May 16, 2006 of U.S. Pat. No. 6,738,852 now U.S. Pat. No. Re. 40,421.*

FIELD OF THE INVENTION

The present invention relates to the field of expansion mechanisms for a palmtop computer. More particularly, the present invention relates to a mechanism for sharing memory access with an accessory such as a palmtop sled based accessory.

BACKGROUND

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

While these palm sized computers ("palmtop" computers) have dramatically reduced size when compared to a desktop or notebook computer, the user would like to be able to perform many of the same types of functions performed using physically larger and more powerful computers. Such functions often require substantial amounts of memory and/or circuitry that is not generally incorporated within a palmtop computer. An example of such a function is that of an MP3 music player. It is conceivable to embed such a player within a so-called "sled" device that couples to the palmtop computer. Unfortunately, such devices are taxing on the processing power of a palmtop computer if the music is stored either on the palmtop computer itself or on a storage device associated with the palmtop computer. In order to access such storage for real time audio playback using an MP3 player, the data stored in the memory device of a conventional palmtop must be converted to a serial format to be transferred through the processor to the serial connector of the palmtop before being played back by such a sled based MP3 player. This is cumbersome and taxing on battery life and processing power of the palmtop computer. Nonetheless, such an arrangement would have advantages since the MP3 player or other sled-based device could theoretically use the palmtop computer as a user interface and could use an existing memory interface to store music or other relevant data.

Unfortunately, the above listed drawbacks may be prohibitive in implementing such an arrangement. Thus, the cost of such sled accessories may suffer by needing to supply an additional connector to support its own memory for storing data (e.g. MP3 music) or personality programs.

SUMMARY OF THE INVENTION

Accordingly, what is needed is an arrangement to permit a sled-based device to directly access a palmtop computer's memory.

In accordance with one embodiment of the invention, a palmtop computer utilizes SD memory modules or other types of memory modules to provide expansion memory. The expansion memory module plugs in to the palmtop computer via an external slot or compartment that is easily accessed by the user. This provides additional memory to the palmtop computer. To facilitate use of expansion devices such as sled or cradle based devices, a connector is provided on the palmtop computer that not only includes conventional power, ground and serial communication terminals, but also provides direct access to the memory module for use by the expansion device. This provides the advantage that the sled or cradle based device can directly access the palmtop computer's memory without using the palmtop computer's processing resources.

A method of expanding capabilities of a palmtop computer with a memory expansion module in accordance with an embodiment of the present invention includes: coupling the memory expansion module to a processor within the palmtop computer; coupling the memory module to an expansion port of the palmtop computer; and coupling a sled device to the palmtop computer, so that the sled device is coupled directly to the memory expansion module and to a communication port of the palmtop computer.

A palmtop computer having enhanced expansion consistent with embodiments of the present invention includes a central processor connected to a bus. An expansion memory is operatively coupled to the bus to provide the central processor with access to the expansion memory. A communication interface is operatively coupled to the bus to provide the central processor with communication with devices outside the palmtop computer. A connector, operatively coupled to communication interface and to the expansion memory, permits an external device to communicate with the central processor via the communication interface and to permit the external device to directly access the expansion memory module.

An expansion device for a palmtop computer consistent with the present invention, wherein the palmtop computer has a central processor, an expansion memory, a communication interface and a palmtop-side connector, the palmtop-side connector being operatively coupled to the communication interface and to the expansion memory, includes an expansion device-side connector suitable for mating with the palmtop-side connector. An expansion device-side communication interface is connected to the expansion device-side connector for communicating with the communication interface of the palmtop computer. A memory interface is connected to the expansion device-side connector for directly accessing the expansion memory of the palmtop computer.

The above summaries are intended to illustrate exemplary embodiments of the invention, which will be best understood in conjunction with the detailed description to follow, and are not intended to limit the scope of the appended claims.

DETAILED DESCRIPTION OF THE INVENTION

Figure 1:
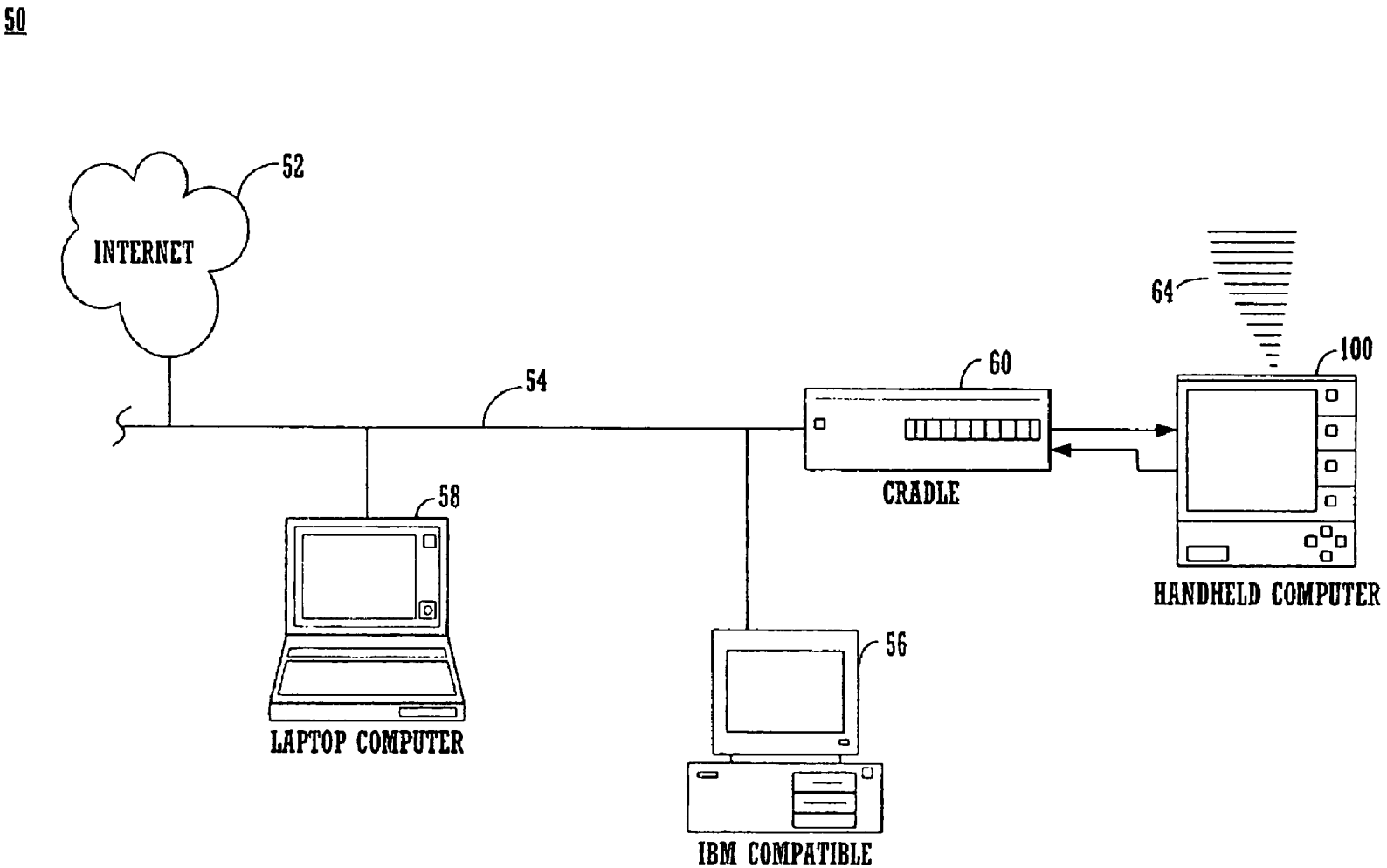
FIG. 1 is system illustration of a palmtop computer system connected to other computer systems and the Internet via a cradle device.

In the following detailed description of the present invention, of a palmtop computer expansion using shared memory access, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Palmtop Computer Expansion Using Shared Memory Access in Accordance with the Present Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

FIG. 1 illustrates a system 50 that can be used in conjunction with the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Bus 54 is also coupled to a cradle 60 for receiving and initiating communication with a palmtop ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
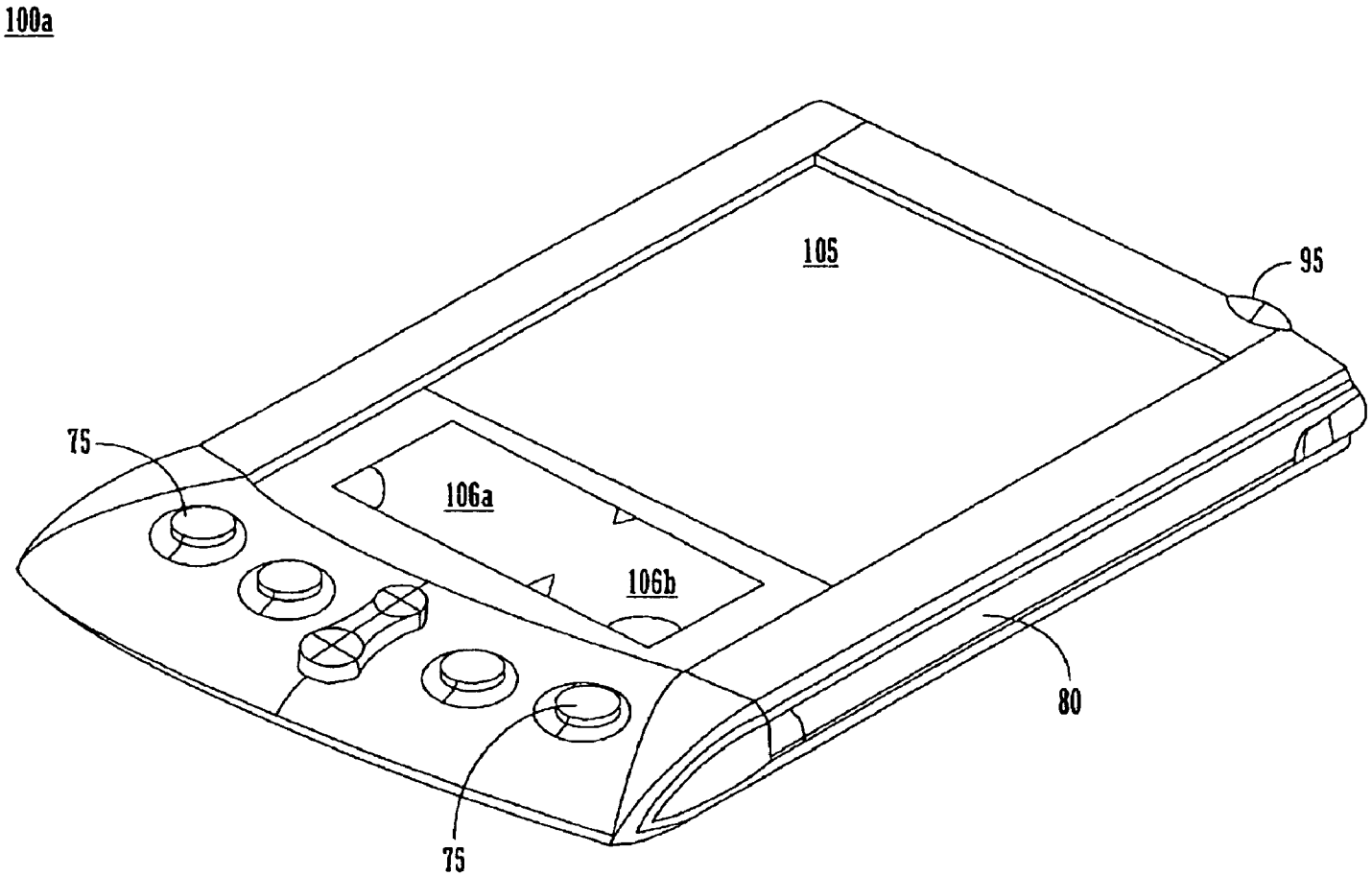
FIG. 2A is a top side perspective view of a palmtop computer system that can be used as a platform for the data entry embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 2B:
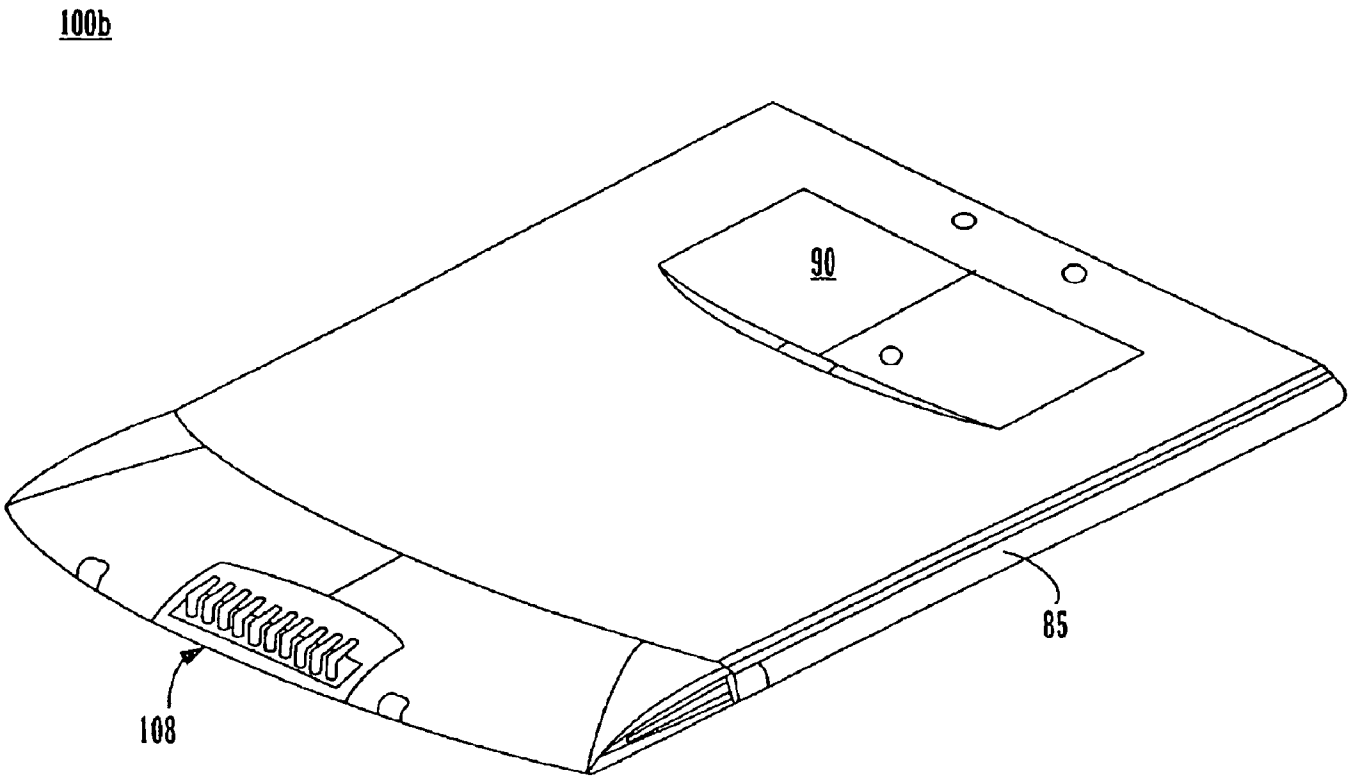
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, USB (Universal Serial Bus), etc. In addition to providing the serial interface, some versions of palmtop computers consistent with the present invention include charging terminals for charging internal batteries through the cradle connection at interface 108. Accordingly, interface 108 typically comprises approximately ten to twelve electrical connector terminals.

Figure 3:
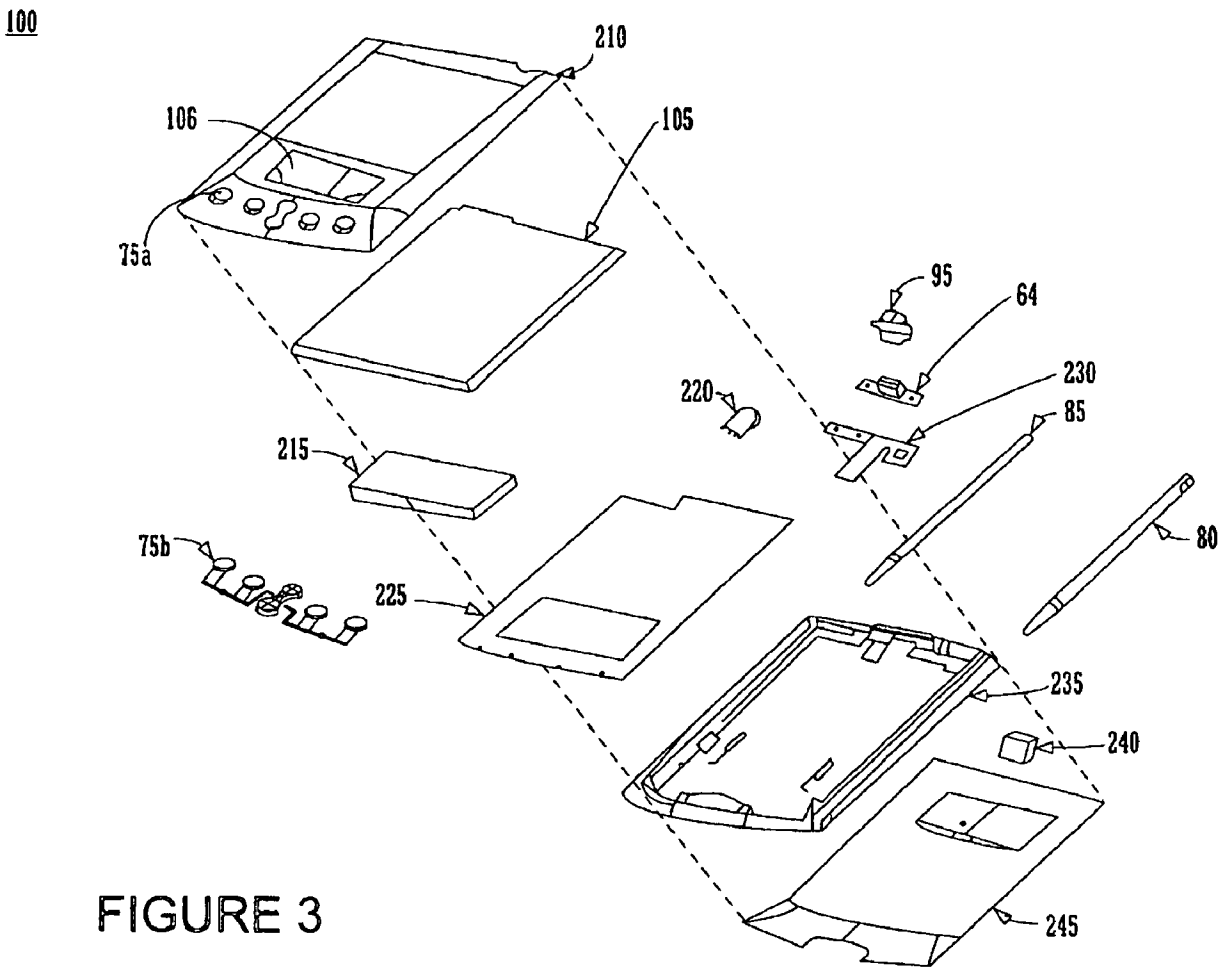
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 4:
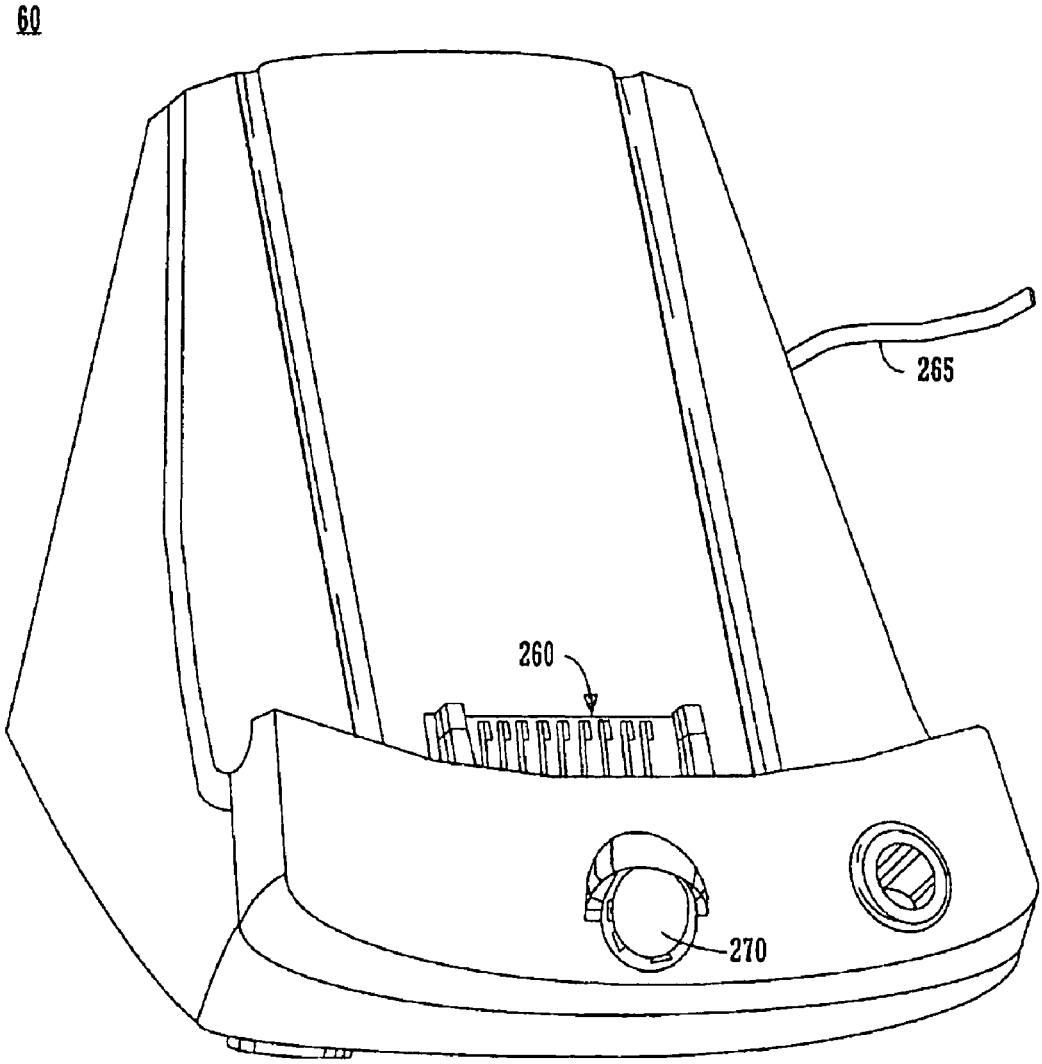
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 5:
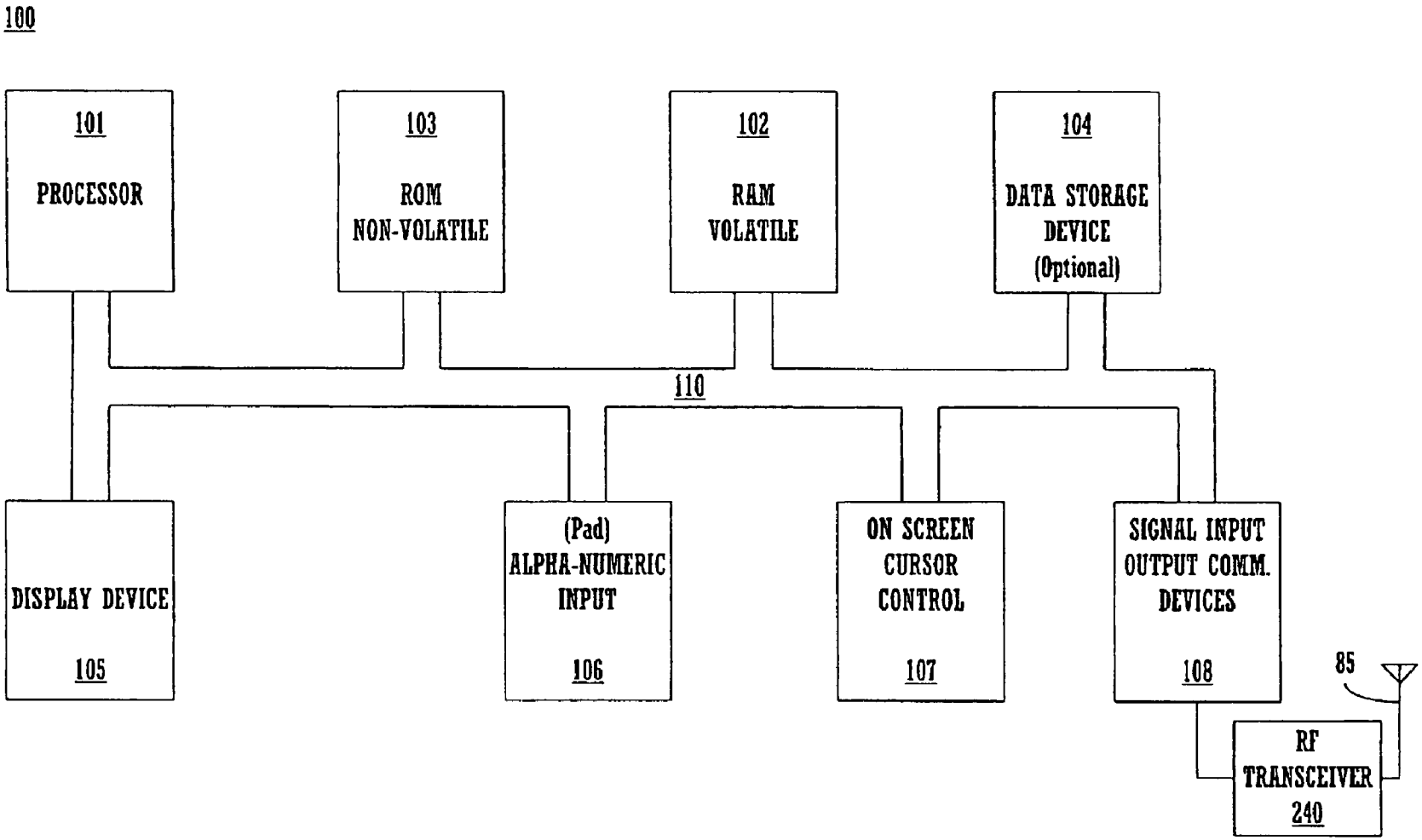
FIG. 5 is a logical block diagram of the palmtop computer system in accordance with an embodiment of the present invention.

FIG. 5 illustrates circuitry of computer system 100 in accordance with an embodiment of the present invention, some of which can be implemented on PC board 225. Computer system 100 includes an address/data bus 110 for communicating information, a central processor 101 coupled with the bus 110 for processing information and instructions, a volatile memory 102, e.g., random access memory (RAM), coupled with the bus 110 for storing information and instructions for the central processor 101 and a non-volatile memory 103, e.g., read only memory (ROM), coupled with the bus 110 for storing static information and instructions for the processor 101. Computer system 100 also includes an optional data storage device 104 (e.g., memory stick, SD memory, etc.) coupled with the bus 110 for storing information and instructions. Device 104 can be removable. As described above, system 100 also contains a display device 105 coupled to the bus 110 for displaying information to the computer user. PC board 225 can contain the processor 101, the bus 110, the ROM 103 and the RAM 102.

Also included in computer system 100 of FIG. 5 is an optional alphanumeric input device 106 which in one implementation is a handwriting recognition pad ("digitizer") having regions 106a and 106b (FIG. 2A), for instance. Device 106 can communicate information and command selections to the central processor 101. System 100 also includes an optional cursor control or directing device 107 coupled to the bus 110 for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 110, can be a serial communication port, USB (Universal Serial Bus), SCSI (Small Computer System Interface), Ethernet or any other suitable communication interface for communicating with the cradle 60 and other external devices. Device 108 can also include an infrared communication port.

Figure 6:
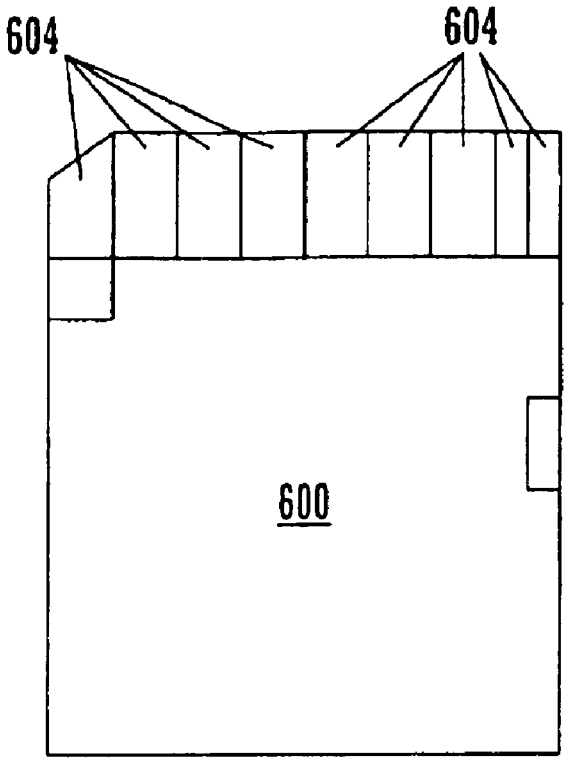
FIG. 6 illustrates a memory or personality module used with the palmtop computer system in accordance with an embodiment of the present invention.

Referring now to FIG. 6, a so-called SD (Secure Digital) memory module 600 used with the palmtop computer system 100 in accordance with an embodiment of the present invention is illustrated. SD cards are an industry standard memory expansion device utilizing flash memory in a package approximately the size of a U.S. postal stamp. Information regarding the SD memory standard can be obtained from www.sdcard.org. SD card 600 includes a plurality of nine electrical connectors situated at one end and labeled 604. The SD memory module standard calls for nine such electrical connectors that carry two ground connections, one power connection, one clock connection, one command connection and four data connections. While currently palmtop computers are available with standard memory in the range of approximately 2 to 16 MB, SD memory expansion cards (and similar expansion products such as the trademarked Memory Stick and SmartMedia memory modules) can provide dramatically more memory in a very compact package. Currently, up to approximately 256 MB of expansion memory is contemplated in the near future for such modules, with even greater capacity likely.

Memory module 600 can be utilized to provide raw data storage as well as to modify the personality or functionality of palmtop computer 100 by storing computer programs and the like. Thus, SD memory module 600 can be used as data storage device 104 (FIG. 5) to provide additional data storage to the palmtop computer 100. Large amounts of data storage capacity can be utilized to store large numbers of entries in an address book or provide access to large documents, images and audio files in the palmtop computer 100.

Figure 7:
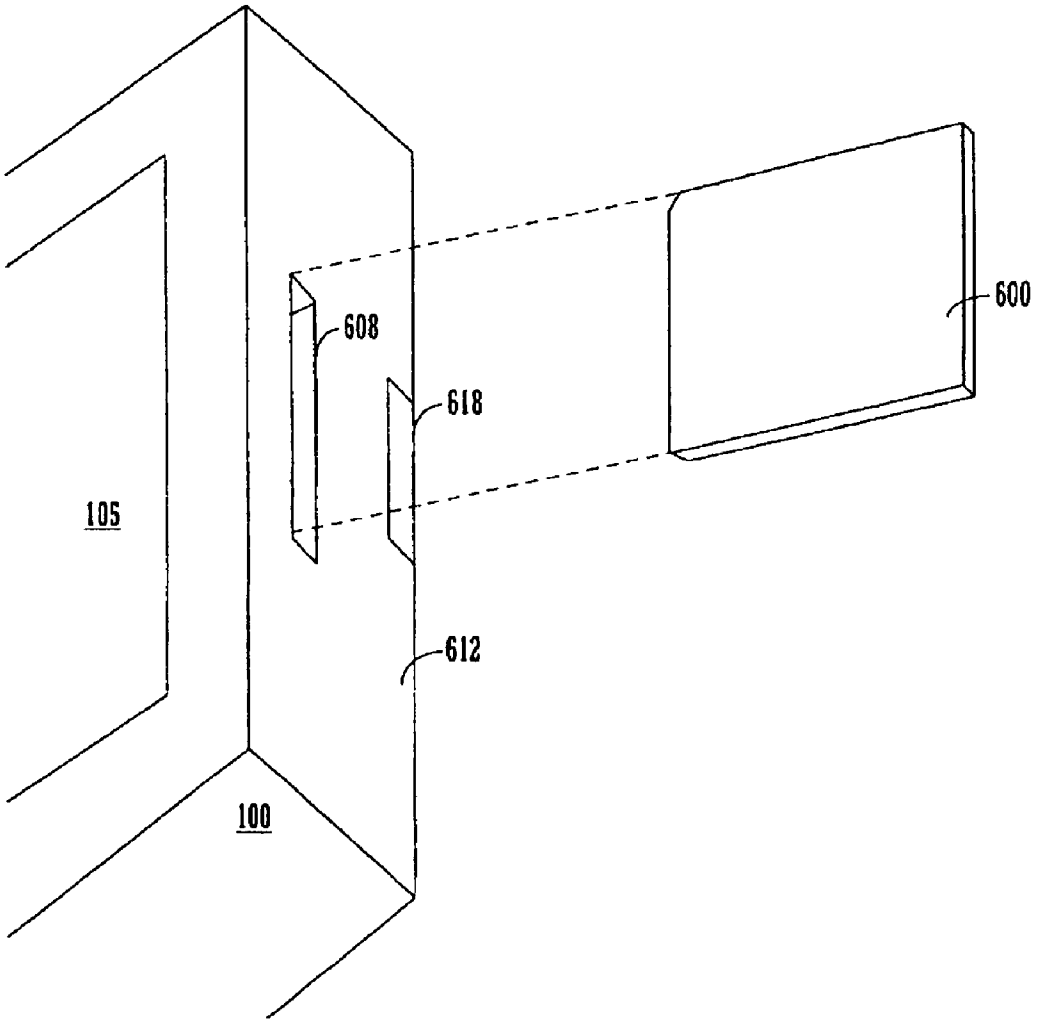
FIG. 7 illustrates one embodiment for coupling the memory module 600 to a port at the top of a palmtop computer.

Referring now to FIG. 7, memory module 600 is illustrated in conjunction with palmtop computer 100. Memory module 600, in the embodiment illustrated, plugs into a port 608 on a top surface 612 of the palmtop computer 100. The port 608 is illustrated as a slot in the top surface 612 for receiving the memory module 600, but this should not be considered limiting. Any suitable mechanism for conveniently installing the expansion memory module, be it an SD module, Memory Stick, SmartMedia or any other type of memory expansion module including custom designed memory expansion modules, is appropriate. In other embodiments, a door may be removed or opened to easily permit access to the expansion storage media. In other embodiments, a slot adjacent a rear surface of the palmtop computer 100 that reveals a surface of the expansion module can be used. The memory card slot 608 is illustrated as being situated near the front surface of palmtop computer 100 with an infrared communication port 618 situated near the rear of the palmtop computer. However, the exact arrangement, as previously stated, is not critical to the present invention.

Figure 8:
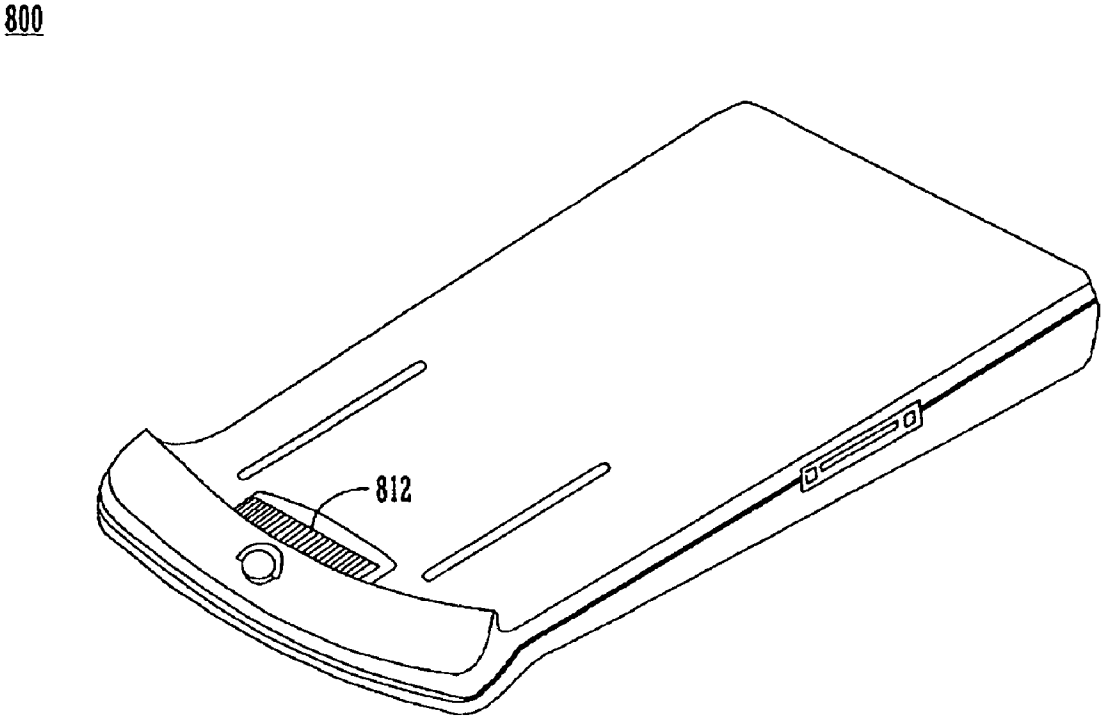
FIG. 8 illustrates a "sled" device used to expand the capabilities of the palmtop computer.

Referring now to FIG. 8, another popular mechanism for expanding the functionality of a palmtop computer is illustrated as sled type expansion device 800. Such a sled-type expansion device is illustrated in greater detail in U.S. design patent application Ser. No. 29/114,772, filed Nov. 30, 1999, attorney docket number 15886-371 entitled "Communication Accessory Device for Handheld Computer", to Francavilla, Urban and Stowers, which is hereby incorporated by reference. Sled device 800 may embody any of a number of electronic devices utilized to enhance the functionality of the palmtop computer 100. By way of example, and not limitation, sled device 800 may incorporate an internal modem, music player (e.g. an MP3 player) or video game device. Sled device 800 may also include latching mechanisms and the like (not shown) to mechanically secure the sled 800 to the palmtop computer 100. Sled type expansion device 800 incorporates a connector 812, which may be any suitable electrical connector that appropriately mates with a similar connector 108 (FIG. 2B) of the palmtop computer 100. Conventionally, connector 812 incorporates a serial communication interface such as an RS232 compliant interface. Other types of interfaces such as Universal Serial Bus (USB), Ethernet, etc. may be similarly utilized to permit communication from the outside world to the processor 101 and associated circuitry of the palmtop computer 100. In addition, power and ground terminals are sometimes provided in connector 812 to either supply power to the palmtop computer 100 to charge its internal batteries or to receive power from the palmtop computer 100 to power the sled device 800.

By interconnecting the sled device 800 with the palmtop computer 100 electrically, the sled device 800 can utilize the processor, memory, display and input capabilities of the palmtop computer 100. However, depending upon the application and type of device embodied in the sled, the functionality may be restricted by the speed of the communication mechanism used for communication between the sled 800 and the palmtop computer 100 or by the processing speed of the palmtop computer's processor 101 or battery capacity of the palmtop computer 100. Since it is desirable to maintain long battery life in the palmtop computer 100, memory access by serial communication through connector 812 imposes severe limitations upon the capabilities of the sled 800 in combination with the palmtop computer 100.

Consider, for example, if sled 800 implements an MP3 player for playing digitally stored music. In order for the MP3 player within sled 800 to access music stored in the expansion memory module 600, processor 101 must retrieve the data representing the music from the data storage device 104 (in the preferred embodiment SD memory module 600), convert the data to serial data for communication via the connector 108 and pass the data on to the sled device 800. In order to accomplish this in real time so that the user does not have to wait for a download from the memory module 600 to listen to a selection of music, processor 101 operates at an extremely high capacity robbing power from other applications and exhausting battery life. Alternatives to this problem might include providing a memory module connector on sled 800. However, this solution increases the cost of the sled device 800 by requiring a memory module connector when one is already readily available within palmtop computer 100. In accordance with the present invention, the sled 800 is provided with direct access to memory module 600 (data storage device 104), bypassing the need for intervention by processor 101.

Figure 9:
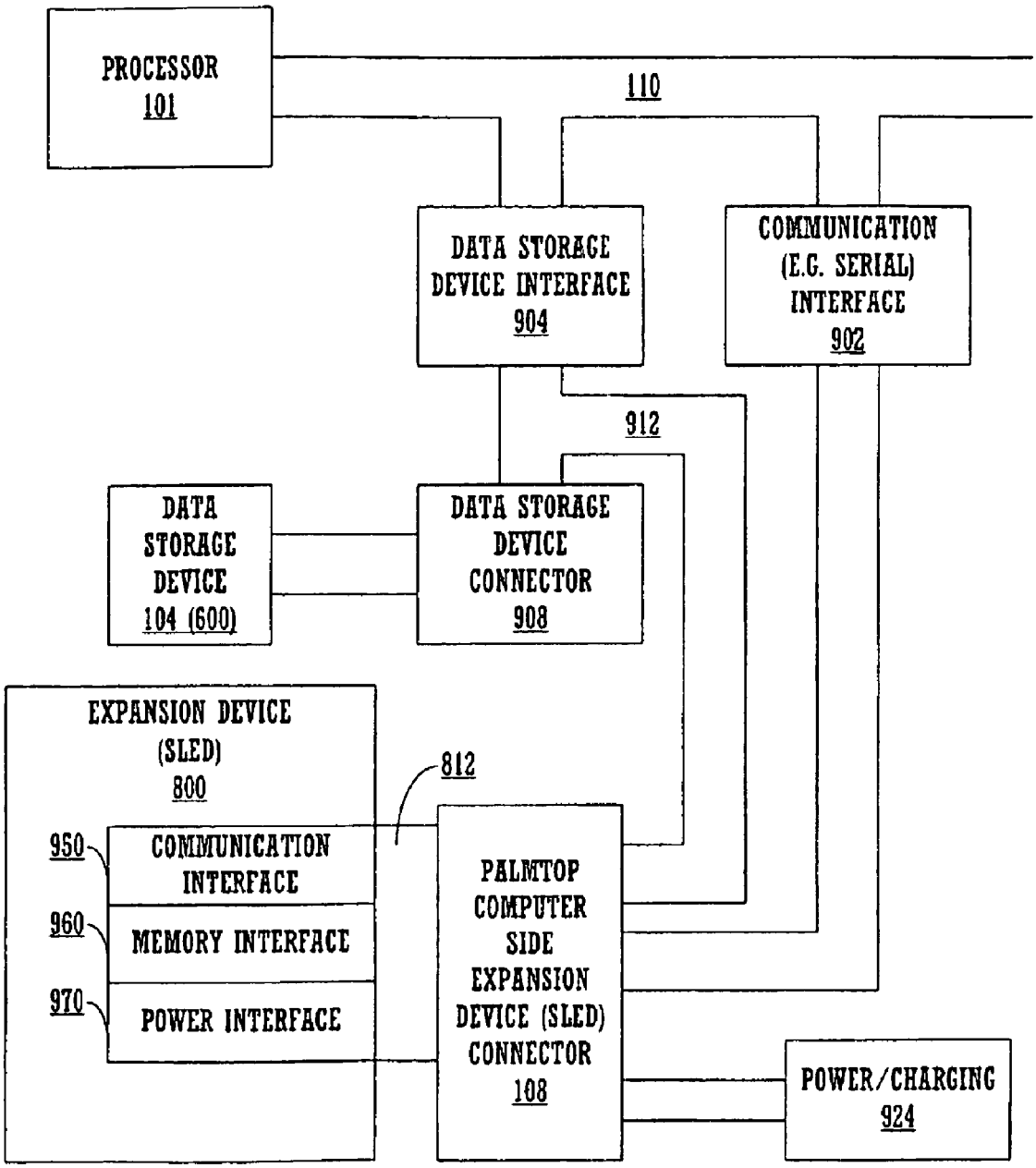
FIG. 9 is a more detailed block diagram of the bus and connector configuration illustrating direct memory access to the sled device.

Referring now to FIG. 9, the electrical block diagram 100 of FIG. 5 is expanded in part to illustrate the detailed connection of the processor 101 within an expansion device such as a sled 800. Processor 101 is coupled to bus 110 as described previously. One function of signal input/output communication device 108 is illustrated as a communication interface 902. In this example, a serial interface is shown, however, a Universal Serial Bus or other serial or parallel communication interfaces are also possible. Communication interface 902 is coupled to connector 108 on the palmtop computer 100 to facilitate communication with devices outside the palmtop computer 100 such as sled 800 or cradle 60. In addition, A bus 110 is connected to a data storage device interface 904 that converts data to and from data storage device 104 (for example, SD module 600) so that processor 101 and other devices connected to bus 110 can access data stored in the data storage device 104. Data storage device 104 is connected to the data storage device interface 904 via a data storage device connector 908 that provides electrical connections which mate with terminals 604 in the case of SD connector 600. Data storage device connector 908, in the case of SD memory expansion module 600 provides a data path for the four data lines of SD module 600 as well as the clock and command lines. Power and ground connections are also supplied on data storage device connector 908. At least the data lines, command line and clock line are provided on bus 912 which is connected to the expansion device connector 108. In this manner, an external expansion device such as sled 800 is provided with direct access to the data storage device 104 via the expansion device connector 108.

In some embodiments, terminals may be provided at expansion device connector 108 to provide for charging and power circuitry 924 to either power the palmtop computer device or the expansion device or charge batteries at one or the other devices. The expansion device connector 108 may be termed the palmtop computer side connector since it is connected physically to the palmtop computer an a whether or not the palmtop computer 100 resides in a cradle, sled or neither of the above. A mating connector 812 (an expansion device-side connector) mates with the expansion device connector 108 to electrically provide access to the communication interface 902 and data storage device 104 by the expansion device 800. Appropriate electrical connections are provided to an expansion device-side communication interface 950, memory interface 960 and possibly power interface 970. In this manner, expansion device 800 can communicate with processor 101 or other circuitry of the palmtop computer 100 via the communication interface 902 and can directly access data stored in data storage device 104 via the expansion device connector 108. The expansion device-side communication interface includes at least one of a Universal Serial Bus (USB) interface, an Ethernet interface, a Serial interface and a Small Computer System Interface (SCSI).

The connectors used in the sled 800 and the palmtop computer 100 are depicted as printed circuit board edge connector type structures. This should not be considered limiting of the present invention, however. In other embodiments, any suitable electrical connector mechanism can be used.

Minimal arbitration is required between the sled 800 and the palmtop computer 100 to use the same memory (e.g., SD memory module 600). The only arbitration required is that only one device can access the memory at any given time. Thus, the palmtop computer 100 is essentially off or quiescent with respect to the memory module 600 whenever the sled 800 is accessing the memory module 600. By way of example and not limitation, a simple handshake or semaphore exchange via serial communication channel between the sled 800 and the host palmtop computer 100 meets these requirements.

In the case of the MP3 player as described earlier, with the arrangement shown in FIG. 9, processor 101 is not required for interaction between the expansion device 800 and the data storage device 104 such as SD memory module 600. In such a player, the communication interface 902 can be utilized by the expansion device 800 to communicate with processor 101 to implement, for example, volume control, play list, music selection, graphics, tone and balance controls, etc. using the palmtop computer 100's I/O capabilities. The data representing MP3 music stored on data storage device 104 can be directly accessed by the expansion device 800 without depleting the palmtop computer 100's battery rapidly by requiring intervention of processor 101 and with great speed since the limitation of the speed of the communication interface 902 is not a factor. In addition, this provides a mechanism whereby the expansion device 800 can utilize an existing hardware expansion port 604 to supply content or data to the expansion device 800 without requiring that the expansion device 800 duplicates such hardware and thereby increase its cost.

Those skilled in the art will appreciate that the embodiments described above can be implemented using other forms of storage than SD. Disc storage as well as other forms of storage including Read Only Memory (ROM) devices, Random Access Memory (RAM) devices, optical storage elements, magnetic storage elements, magneto-optical storage elements, flash memory, core memory and/or other memory modules such as SmartMedia cards, Memory Sticks and other equivalent storage technologies without departing from the present invention. Such alternative storage devices should be considered equivalents.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

[1. A method of expanding capabilities of a palmtop computer with a memory expansion module, comprising:

coupling the memory expansion module to a processor within the palmtop computer;

coupling the memory expansion module to an expansion port of the palmtop computer; and coupling a sled device to the palmtop computer, so that the sled device is coupled directly to the memory expansion module and to a communication port of the palmtop computer.]

[2. The method according to claim 1, wherein the expansion memory module comprises a Secure Digital (SD) compliant memory module.]

[3. The method according to claim 1, wherein the expansion memory module comprises a SmartMedia compliant memory module.]

[4. The method according to claim 1, wherein the expansion memory module comprises a memory stick compliant memory module.]

[5. The method according to claim 1, wherein the sled device comprises a music player; and further comprising:

at said sled device, directly accessing music stored on the expansion memory module.]

[6. The method according to claim 5, wherein the music player comprises an MP3 music player.]

[7. A palmtop computer having enhanced expansion, comprising:

a central processor connected to a bus;

an expansion memory operatively coupled to the bus to provide the central processor with access to the expansion memory;

a communication interface operatively coupled to the bus to provide the central processor with communication with devices outside the palmtop computer; and a connector, operatively coupled to the communication interface and to the expansion memory, to permit an external device to communicate with the central processor via the communication interface and to permit the external device to directly access the expansion memory.]

[8. The apparatus according to claim 7, further comprising a memory interface connected to the bus and adapting the expansion memory for access over the bus.]

[9. The apparatus according to claim 7, wherein the expansion memory comprises one of a Secure Digital (SD) compliant memory module, a SmartMedia compliant memory module and a memory stick compliant memory module.]

[10. The apparatus according to claim 7, wherein the external device comprises a sled device.]

[11. The apparatus according to claim 10, wherein the sled device comprises a music player wherein said sled device directly accesses music stored on the expansion memory.]

[12. The apparatus according to claim 11, wherein the music player comprises an MP3, music player.]

[13. The apparatus according to claim 11, wherein the connector comprises one of a circuit board edge connector and a bullet style connector.]

[14. An expansion device for a palmtop computer, the palmtop computer having a central processor, an expansion memory, a communication interface and a palmtop-side connector, the palmtop-side connector being operatively coupled to the communication interface and to the expansion memory, the expansion device comprising:

an expansion device-side connector suitable for mating with the palmtop-side connector;

an expansion device-side communication interface connected to the expansion device-side connector for communicating with the communication interface of the palmtop computer; and a memory interface connected to the expansion device-side connector for directly accessing the expansion memory of the palmtop computer.]

[15. The apparatus according to claim 14, wherein the expansion memory comprises one of a Secure Digital (SD) compliant memory module, a SmartMedia compliant memory module and a memory stick compliant memory module, and wherein the memory interface directly accesses the expansion memory.]

[16. The apparatus according to claim 14, wherein the external device comprises a sled device.]

[17. The apparatus according to claim 16, wherein the sled device comprises a music player wherein said sled device directly accesses music stored on the expansion memory.]

[18. The apparatus according to claim 17, wherein the music player comprises an MP3 music player.]

[19. The apparatus according to claim 17, wherein the palmtop-side connector comprises one of a circuit board edge connector and a bullet style connector.]

[20. The apparatus according to claim 17, wherein the expansion device-side communication interface comprises at least one of a Universal Serial Bus (USB) interface, an Ethernet interface, a Serial interface and a Small Computer System Interface (SCSI).]

*21. A method of accessing a storage medium of a device including a processor, said method comprising:*

*communicating with said device; and*

*accessing said storage medium without use of said processor.*

*22. The method as recited in claim 21 wherein said accessing comprises:*

*accessing said storage medium based on at least one rule.*

*23. The method as recited in claim 22 wherein said rule comprises allowing either said processor or other than said processor to access said storage medium at any given time.*

*24. The method as recited in claim 21 wherein said accessing comprises:*

*participating in an arbitration with said device to acquire access to said storage medium while denying said processor access to said storage medium; and*

*based on said arbitration, accessing said storage medium.*

*25. The method as recited in claim 24 wherein said arbitration comprises a handshake exchange.*

*26. The method as recited in claim 24 wherein said arbitration comprises a semaphore exchange.*

*27. The method as recited in claim 21 wherein said communicating comprises:*

*communicating via a communication interface comprising at least one of a Universal Serial Bus (USB) interface, an Ethernet interface, a Small Computer System Interface (SCSI), IEEE 1394 interface, a serial interface, a parallel interface, and a wireless communication interface.*

*28. A method of accessing a storage medium of a device including a processor, said method comprising:*

*enabling access to said storage medium without use of said processor; and*

*controlling said access to said storage medium.*

*29. The method as recited in claim 28 wherein said controlling said access comprises:*

*controlling said access with at least one rule, wherein said rule comprises allowing either said processor or other than said processor to access said storage medium at any given time.*

*30. The method as recited in claim 28 wherein said controlling said access comprises:*

*controlling said access with arbitration to acquire access to said storage medium while denying said processor access to said storage medium.*

*31. The method as recited in claim 30 wherein said arbitration comprises a handshake exchange.*

*32. The method as recited in claim 30 wherein said arbitration comprises a semaphore exchange.*

* * * * *

UNITED STATES PATENT AND TRADEMARK OFFICE

CERTIFICATE OF CORRECTION

PATENT NO. : RE43,862 E
APPLICATION NO. : 12/157134
DATED : December 11, 2012
INVENTOR(S) : Neal A. Osborn It is certified that error appears in the above-identified patent and that said Letters Patent is hereby corrected as shown below:

On the Title page, item (54) and in the Specification, column 1, line 2, Title, delete "SHAPED" and insert -- SHARED --, therefor.

Signed and Sealed this
Second Day of April, 2013

Teresa Stanek Rea
*Acting Director of the United States Patent and Trademark Office*